United States Patent [19]
Wichgers et al.

[11] Patent Number: 5,936,552
[45] Date of Patent: Aug. 10, 1999

[54] INTEGRATED HORIZONTAL AND PROFILE TERRAIN DISPLAY FORMAT FOR SITUATIONAL AWARENESS

[75] Inventors: Joel M. Wichgers; Jeffrey L. Spicer, both of Cedar Rapids, Iowa

[73] Assignee: Rockwell Science Center, Inc., Thousand Oaks, Calif.

[21] Appl. No.: 08/874,017

[22] Filed: Jun. 12, 1997

[51] Int. Cl.[6] .................................................. G08B 23/00
[52] U.S. Cl. ........................ 340/963; 340/961; 340/968; 340/970; 701/207; 701/213; 701/219; 701/301; 342/26; 342/29; 342/176; 342/179; 345/427
[58] Field of Search .................................. 340/963, 970, 340/961, 968; 701/297, 301, 221, 300, 213, 219; 345/427, 419; 342/26, 29, 41, 179, 176, 197, 33; 348/116

[56] References Cited

U.S. PATENT DOCUMENTS

| | | |
|---|---|---|
| 3,786,505 | 1/1974 | Rennie ..................................... 342/104 |
| 3,958,219 | 5/1976 | Bateman et al. ......................... 340/970 |
| 4,224,669 | 9/1980 | Brame .......................................... 701/8 |
| 4,646,244 | 2/1987 | Bateman et al. ......................... 701/301 |
| 5,202,690 | 4/1993 | Frederick .................................. 342/26 |
| 5,313,201 | 5/1994 | Ryan ....................................... 340/961 |
| 5,355,442 | 10/1994 | Paglieroni et al. ..................... 345/427 |
| 5,381,338 | 1/1995 | Wysocki et al. ......................... 701/207 |
| 5,488,563 | 1/1996 | Chazelle et al. ........................ 701/301 |
| 5,751,289 | 5/1998 | Myers ..................................... 345/419 |
| 5,781,146 | 7/1998 | Frederick .................................. 342/26 |

*Primary Examiner*—Benjamin C. Lee
*Attorney, Agent, or Firm*—Kyle Eppele; James P. O'Shaughnessy

[57] ABSTRACT

A visual display format for a terrain situational awareness system comprising a horizontal terrain elevation view and a profile terrain elevation view of potential terrain hazards integrated onto a single display.

55 Claims, 4 Drawing Sheets

5,936,552

INTEGRATED HORIZONTAL AND PROFILE TERRAIN DISPLAY FORMAT FOR SITUATIONAL AWARENESS

BACKGROUND OF THE INVENTION

The present invention relates generally to a collision warning system and, more particularly, to a method and apparatus for providing a real-time, dynamic display of any terrain hazards so as to prevent Controlled Flight Into Terrain (CFIT). Controlled flight into terrain continues to plague air travel as one of the leading causes of fatal aircraft crashes.

The majority of aircraft are equipped with an inertial guidance system which can calculate the position, velocity, and altitude of an aircraft at any interval after take off for the purpose of directing its future course. Although the system is self-contained and can generate navigational data based on initial time, position, orientation, etc., without the aid of external information, the system is subject to a certain amount of drift.

Aircraft altitude is also measured by a pressure altimeter or a baro-inertial means which provide altitude relative to sea level. Altitude relative to the ground is measured by a radio altimeter which is commonly a low powered radar which measures the vertical distance between the aircraft and the ground. Radio altimeters are an essential part of many avionics systems and are widely used over mountainous regions to indicate terrain clearance. However, the altitude clearance provided is for the aircraft's present position only, and one cannot predict future obstacles.

Also known are laser altimeters in which a laser beam modulated by radio frequencies is directed downward and reflected from the terrain. The reflection is gathered by a telescope system, sensed with a photomultiplier, and phase compared with the original signal.

For the past twenty years, the standard system for alerting the flight crew of an aircraft of an impending collision with terrain has been the Ground Proximity Warning System (GPWS) which warns of potentially dangerous situations where a collision with the terrain may occur. The system relies on measuring the clearance between the terrain immediately below the aircraft and operates by examining the rate of aircraft descent, as measured by a barometric altimeter, the aircraft configuration, and the aircraft's ground clearance to generate a warning if a dangerous flight profile is detected. The GPWS uses basic aircraft data that has no direct knowledge of the real terrain in the vicinity of the aircraft. This system is generally adequate for use in regions having an essentially flat or gently rolling/sloping terrain, however, provides no warning of obstacles in front of the aircraft, such as a mountain range or man-made obstacles (e.g., towers and the like). Because the GPWS operates without knowledge of the real terrain in the vicinity of the aircraft, the result is often a false warning in conditions that are not a real threat, or reduced warning times for real terrain threats. As a result of false alarms, flight crews typically develop an apathy for or mistrust of the warnings. Such apathy or mistrust may lead the crew to ignore a warning or respond less quickly in a real warning situation. While the GPWS systems offer some protection, the number of CFIT accidents is still unacceptably high as a result of the inherent limitations in the GPWS.

The technology is now available to provide an improved method of alerting a flight crew of potential CFIT conditions. This technology includes: (1) accurate aircraft present position information, (2) terrain data and suitable storage means, and (3) computer processing resources. The improved alerting system is referred to as a Ground Collision Avoidance System (GCAS). It utilizes aircraft present position information, aircraft state information, and a digital terrain database to determine the flight path of the aircraft relative to the surrounding terrain. One such system is described by Brame in U.S. Pat. No. 4,224,669, herein incorporated by reference in its entirety.

While the advent of advanced technology aircraft and flightdeck automation may reduce the number of functions a flight crew is actively or directly involved in, the crew's responsibility for correct and timely performance of those activities is not reduced. Where advanced automation facilitates a reduction in crew size, the crew's oversight of cockpit activities may become more difficult as many concurrent activities are performed and monitored by a fewer number of people.

Flight crew inactivity, fatigue, or complacency is one potential side effect of flightdeck automation When automation functions reliably, as it does most of the time, it may induce pilots to be less alert in monitoring aircraft behavior and less prepared to take immediate action when needed.

Another problem with flight deck design is that it may lack a human-centered design philosophy that addresses the capabilities and limitations of humans, and the proper role and function of the human in piloting advanced technology aircraft.

Aircraft monitoring may be necessary for long periods of time and the crew may be required to integrate information spread over several parts of the interface. In some cases, crew workload may be high at certain times and low at others, possibly resulting in periods of excessive workload followed by periods of boredom. The combination of large amounts of information and poor formatting or integration may serve to increase crew workload. It would, therefore, be desirable to provide integration of terrain and other data onto a single display.

It is, therefore, an object of the present invention to provide a terrain awareness display that uses a format that provides a pilot or flight crew with complete situational awareness of potential terrain hazards to the aircraft. The information is formatted to provide an interface that provides the data conveniently, simply, and intuitively in a format that is easily assimilated and interpreted by a human operator.

Another object of the present invention is to provide a terrain awareness display format that integrates horizontal data and flight path profile data onto a single display, but which at the same time is not so abstracted or simplified as to compromise the usefulness of the data in supporting effective flight crew decision making.

Another object of the present invention is to provide a display that provides a visual representation of an aircraft's position relative to terrain and obstacles.

Another object of the present invention is to provide a terrain warning system, whereby the number of false warnings are reduced, and whereby the validity of the warning can immediately and easily be verified.

Yet another object of the invention is to provide a display format further integrating information to provide a flight crew with additional situational awareness concerning other potential hazards, such as other aircraft, weather, and the like.

SUMMARY OF THE INVENTION

The objects of the present invention are provided by a terrain situational awareness system employing a display format that enhances a crew's situational awareness of terrain hazards and man-made obstacles. The terrain awareness system employs positional data and a terrain database to provide visual information and warning.

The terms "terrain" or "terrain database," as used herein, are intended to include not only the locations of natural terrain obstacles such as mountains or other high ground areas, but also man-made obstacles such as radio towers, buildings, and the like. The database may also include the boundaries of restricted airspace (such as around military installations), airport locations, bodies of water and the like.

The display according to the invention employs accurate position information and is not limited to any particular source of position information. Typical navigational systems utilize Global Navigational Satellite System (GNSS), inertial devices, LORAN, OMEGA, or the like. In a particularly preferred embodiment, the position data is obtained from a combination of sources, or utilizes the best available position information, for example, as determined by the navigation function.

The terrain awareness system according to the present invention employs a display such as a Cathode Ray Tube (CRT), Liquid Crystal Display (LCD) display, or the like, which integrates both horizontal and profile perspectives of potential hazards. Such that a crew will instantaneously know whether their path, within their vehicle's operational envelope, is hazardous.

BRIEF DESCRIPTION OF THE DRAWINGS

The invention will now be described by way of example only with reference to the accompanying drawings in which.

DETAILED DESCRIPTION OF THE INVENTION

Figure 1:
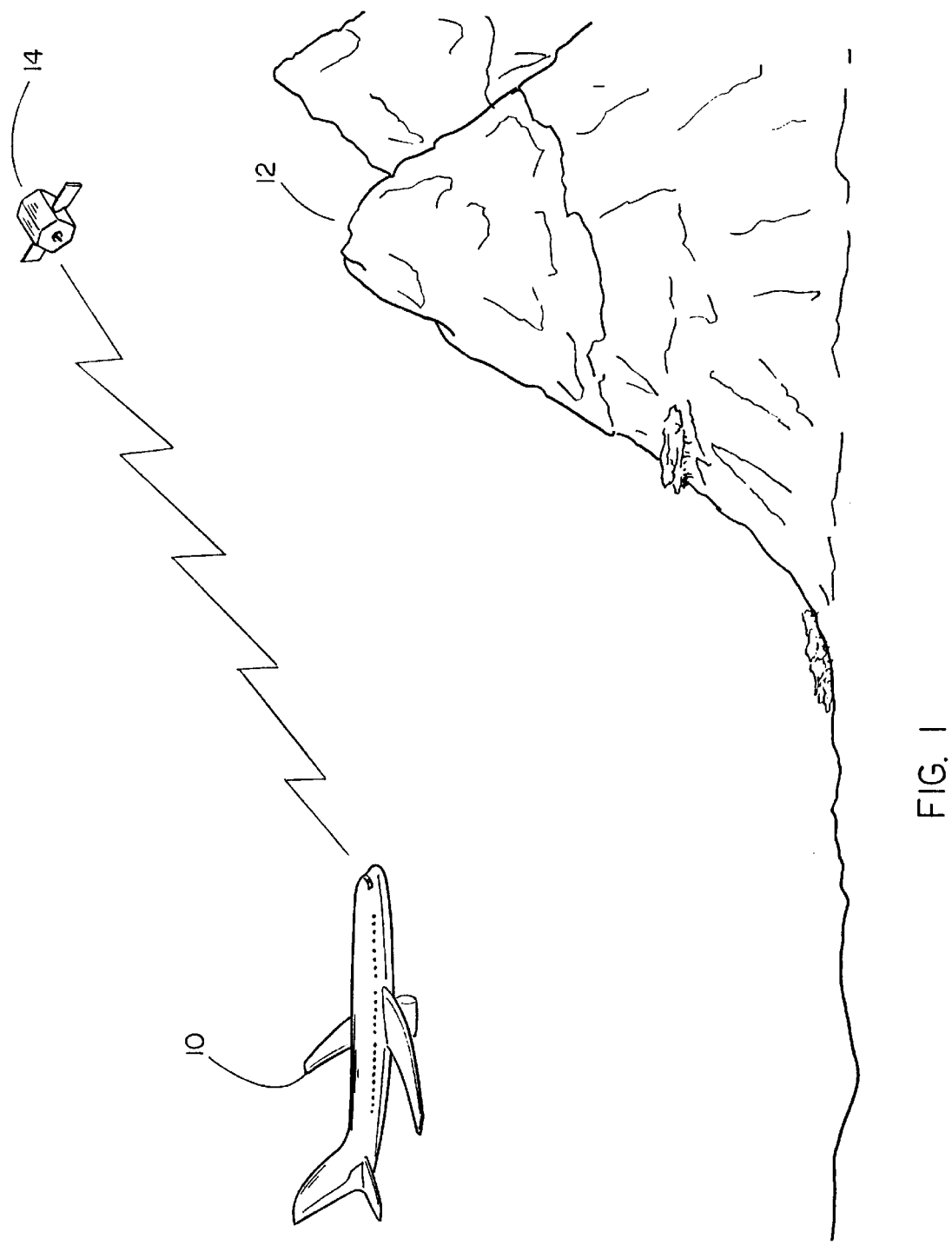
FIG. 1 shows a pictorial representation of an aircraft in the proximity of an elevated terrain feature.

FIG. 1 shows an aircraft 10 in the proximity of elevated terrain 12. Although the terrain situational awareness display according to the present invention is described primarily in reference to embodiments employed for use as an aircraft situational awareness or navigational aid, it should be noted that the integrated terrain situational awareness display can also be used as a situational awareness or navigational aid for ground-based vehicles and surface or subsurface water-based vehicles. For example, the display format according to the present invention can be utilized for underwater terrain aided navigation not only for underwater craft, but also for surface craft, particularly when navigating marine areas such as harbors, ports, coastal shipping routes, or other waterways to aid in the avoidance of collisions with sandbars, the shoreline, shallow waters, piers, or other underwater (natural or man-made) terrain obstacles such as sandbars, or the like.

Additionally, other situational awareness information could be integrated as appropriate for the specific application, including, for example, navigation information (e.g., route), other vehicles, weather, air or underwater currents, and animals that may pose a threat to the vehicle (e.g., birds).

FIG. 1 shows a preferred embodiment of the present invention wherein aircraft 10 is equipped with a receiver capable of receiving and processing a positioning signal from a satellite positioning system such as a GNSS or other accurate navigational system. As an exemplary embodiment, GPS may be utilized. The GPS is a space-based radio navigation system managed by the U.S. Air Force for the United States Government. The U.S. Government provides civilian access to the GPS through a service called the Standard Positioning Service (SPS). The SPS is intentionally designed to provide a positioning capability which is less accurate than the Precise Positioning Service provided to authorized users. There are various methods which have been devised to increase the accuracy of GPS.

In an exemplary embodiment (FIG. 1), the aircraft receives the satellite positioning reference signal from a satellite 14 operating as a part of satellite positioning system satellite constellation. Typically the signals from a plurality of satellites, preferably four or more, is required to derive a coordinate position. Where the GPS is employed, further reference signals which are not part of the GPS system may also be used to compensate for a degraded GPS signal, which may be transmitted as, for example, an FM carrier sublink by land-based or space-based locations. Such correcting signals may be provided by a third-party differential correction service provider. Other methods of correcting the degraded GPS signal may also be utilized which do not require an independent correcting signal. For example, signal processing techniques such as cross correlation of the military signal and the civilian signal may be utilized to improve the accuracy of the civilian signal.

Figure 2:
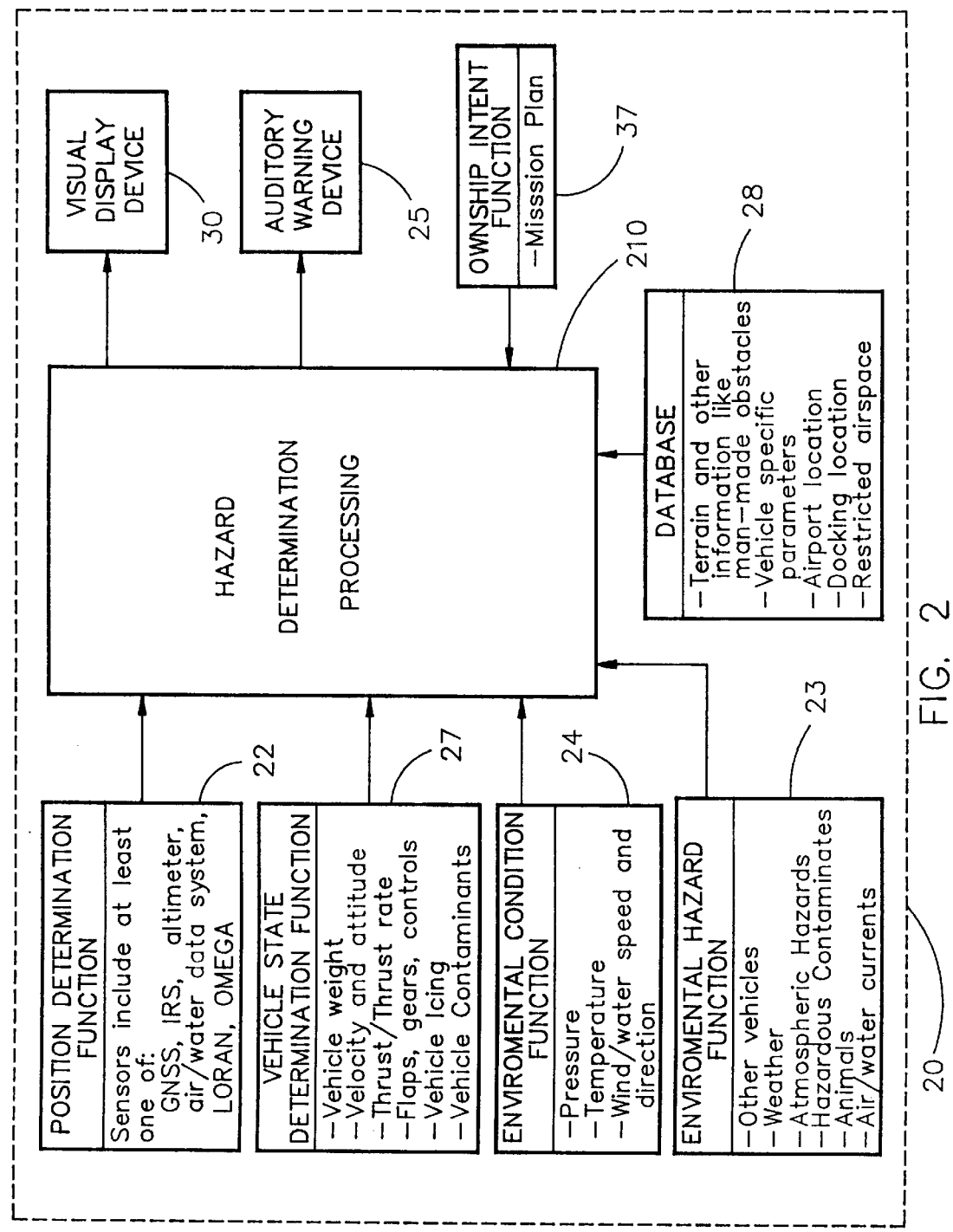
FIG. 2 shows a block diagram of a preferred embodiment of the terrain situational awareness system according to the present invention.

Referring now to FIG. 2, there is shown a block diagram of an exemplary terrain situational advisory system 20 employing the integrated display 30 according to the present invention. The terrain situation advisory system 20 fundamentally comprises: (1) a dynamic data determination function, which preferably includes (a) an environmental hazard function 23, (b) a position determination function 22, (c) a vehicle state determination function 27, and (d) an environmental condition function 24; (2) own ship vehicle intent (mission plan) function 37; and (3) a database 28. The dynamic data determination function, own ship vehicle intent (mission plan) function 37; and database 28 provide data for analysis to the hazard determination processing function 210. The information is displayed in real-time in a dynamic format on the display 30 and a warning is issued (for example, visual or auditory) if an unsafe path profile is detected.

In the particular illustration shown, the environmental hazard function 23 collects information regarding other vehicles (such as position, path, speed, type, and the like), the weather, air/water currents, hazardous contaminants, animals, and atmospheric debris (such as volcanic ash, and the like) and provides this information for processing and analysis to the hazard determination processing function 210. Additionally, position determination function 22 is utilized to receive signals to be used to determine vehicle position via antenna 26 which are converted into a signal capable of being processed by the hazard determination processing function 210. Likewise, the vehicle state determination function 27 collects data regarding own vehicle weight, velocity and altitude, thrust/thrust rate, operational configuration (flaps, fuel quantity, fuel flow rate, gear position, controls and the like), vehicle icing or contamination and provides this information to the hazard determination processing function 210. Further, the environmental condition function provides pressure, temperature and wind/water speed and direction data to the hazard determination processing function 210.

The hazard determination processing function 210 also receives terrain information from a database 28. Such information may comprise terrain elevation and obstacle data and optionally other data, such as airport location, docking location the boundaries of restricted airspace, restricted elevations for particular airspace, and the like. The hazard determination processing function 210 further comprises means for receiving position data from the position determining function 22, determining the aircraft's position relative to the terrain data stored in memory 28, and determining whether an auditory warning should be issued to an auditory warning function 25. The hazard determination processing function 210 further comprises horizontal altitude display generator and profile altitude display generator for integrated output to display device 30.

The terrain situational awareness system 20 has been shown in FIG. 2 via a functional block diagram for exemplary and illustrative purposes and it should be understood that many other implementations, including various analog and digital implementations, are possible, including implementations employing logic other than that shown in FIG. 2.

In one preferred embodiment according to the present invention, aircraft position can be calculated from inertial navigation units and altimeters such as radio, laser, pressure, and the like. This would allow use of the display format according to the present invention during GPS service disruption or service failure. Also, a comparator may be employed to compare position and state data calculated via on-board instrumentation with position and state data received from a satellite-based positioning system for verification of position data, calibration of on-board instruments and sensors, and the like.

In another preferred embodiment according to the present invention, a radar or laser altimeter or other on-board instrumentation may be used to compare the terrain actually flown over with the predicted terrain stored in the database, thereby verifying position data and/or correctness of the selected terrain database.

In yet another preferred embodiment according to the present invention, the terrain situational awareness system is used in conjunction with a Flight Management System (FMS) wherein position and terrain calculations may be performed by a central FMS processor, for example, as a part of or enhancement to a GPWS and/or a GCAS, and may be employed with a visual or audible alarm systems (or both) based on the predicted flight path of the aircraft.

Figure 3:
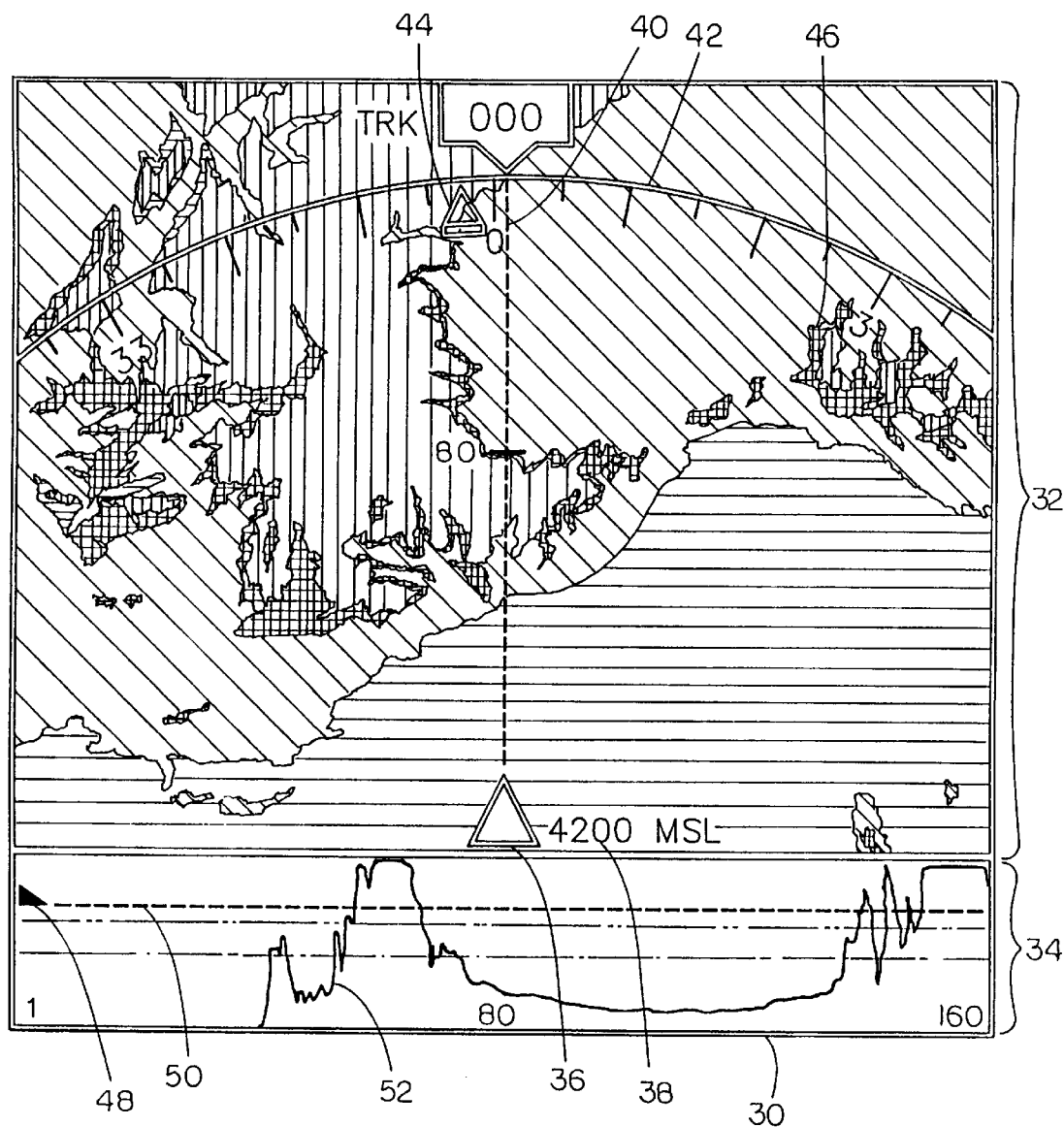
FIG. 3 shows a preferred embodiment of the terrain situational awareness display screen format according to the present invention.

Referring now to FIG. 3, there is shown a preferred terrain situational awareness display 30. The display 30 depicted in FIG. 3 is based on a display generated using a Jeppesen supplied database that covers a 300 by 270 mile area which includes southern France, portions of Italy, and the Mediterranean Sea.

Display 30 may comprise, for example, a CRT display, an LCD display, and the like. Display 30 depicts the terrain awareness display format according to the present invention which comprises a horizontal or plan view portion 32, located on the upper portion of display 30 in the particular embodiment shown here, and a profile perspective portion 34, located on the lower portion of display 30.

The horizontal portion 32 indicates the current aircraft position as shown by triangle icon 36. The current aircraft altitude may also be indicated on the display 30 according to the present invention. In the embodiment depicted in FIG. 3, the altitude 38 is depicted on upper portion 32 adjacent to aircraft position icon 36, as a barometric altitude of 4200 feet above Mean Sea Level (MSL). The display according to the present invention may also give the aircraft heading. In the particular example depicted in FIG. 3, the aircraft heading is one degree as indicated by the vertical dashed line 40 extending from triangle icon 36 to compass rose 42 and the selected aircraft heading is 357 degrees as indicated by the triangular heading bug 44 on the compass rose 42.

The upper portion 32 of display 30 can display elevation data for the region depicted on the display. The display can be made to show database supplied elevation data for the region around the aircraft as determined by the position determination function. The display can range from a monochromatic display wherein terrain elevations higher than a given value are depicted by turning on or illuminating the corresponding pixels of the display. See, for example, regions 46 of display 30. The display preferably displays elevations relative to the aircraft rather than absolute elevations. For example, all elevations higher that the current altitude of the aircraft may be displayed, or, all elevations higher than some preselected "comfort zone" below the aircraft, e.g., 1500 feet below the current aircraft altitude, can be displayed.

In addition to black and white or monochromatic display, gray scale or color displays may also be employed in accordance with the present invention.

The scale of the display 30 is given by numerals thereon. In the particular scenario shown in FIG. 3, the scale of display is such that a total of 160 miles is displayed from the aircraft (triangle icon 36) to the top of the screen. The numeral "80" in the center of upper portion 32 of display screen 30 indicates the midpoint, i.e., the point 80 nautical miles from the aircraft (160÷2=80). The numerals "1," "80," and "160" similarly show the scale at the bottom of profile portion 34.

The display format scaling is preferably selectable. Format scaling may be made selectable in specified increments such as 10, 20, 40, 80, 160 (shown), 320, and 640 nautical miles. This would make it similar to existing weather radar display scale selections. However, the display format of the terrain awareness system according to the present invention is not limited to any particular scale selections, and may be made to be, for example, continuously selectable.

The profile situational awareness display portion 34 of the display 30 shows the aircraft present position as indicated by triangle symbol 48. Horizontal dashed line 50 represents current aircraft altitude and is useful for determining terrain clearance. Terrain profile 52 depicts the vertical terrain elevation profile of the path directly in front of the aircraft. The terrain profile 52 of lower portion 34 is taken along the vertical dashed line 40 of upper portion 32.

Where a monochromatic display or display format is employed, terrain elevations higher than current aircraft altitude and/or elevations below the altitude of the aircraft but higher than a selected comfort zone (e.g., all terrain higher in elevation than 500 feet below the aircraft altitude) may be indicated by depicting that portion of the terrain profile 52 in a different intensity. For example, line intensity can be increased or made more bold by increasing the thickness of terrain profile 52 at the desired portions. Similarly, elevations depicted on horizon portion 32 can be depicted in like manner. Where a gray scale display or display format is employed, the various elevations as depicted on terrain profile 52 and horizon portion 32 may be differentiated using shades of varying intensity.

The display 30 according to the present invention is preferably shown in color, and color coded (colors not shown) using colors coded to elevations relative to the aircraft. Although the present invention is not limited to any particular coding scheme, one coding scheme that is particularly intuitive and thus advantageous for use in the display of the terrain awareness system according to the present invention is to use the colors red, yellow, and green to indicate warning, caution, and all clear, respectively. In this scheme, horizontal portion 32 depicting elevational or topographical relief is preferably shown using the same color scheme as terrain profile 52. Thus, the color red, indicating warning, may be used to display all portions of the flight profile 52 which are higher than the current altitude as indicated by dashed line 50. Similarly, all portions in the region shown on upper portion 32 may likewise preferably depicted in red (not shown).

The color yellow, indicating caution, may be used to indicate the location of terrain that is higher than some selected comfort zone below the aircraft's current altitude, e.g., 1000 feet, 1500 feet, 2000 feet, etc., or any other preselected value or function. Accordingly, those portions of terrain profile 52 within the selected comfort zone, as well as those portions of upper portion 32 would be displayed in yellow under the preferred color scheme.

The color green, indicating all clear, may be used to indicate terrain with an elevation below the selected comfort zone and, thus, is not currently a hazard to the aircraft. Optionally, blue may be used to indicate large bodies of water. Other colors or symbology may be utilized to indicate other database information on the display, such as restricted airspace, airport location, etc.

Figure 4:
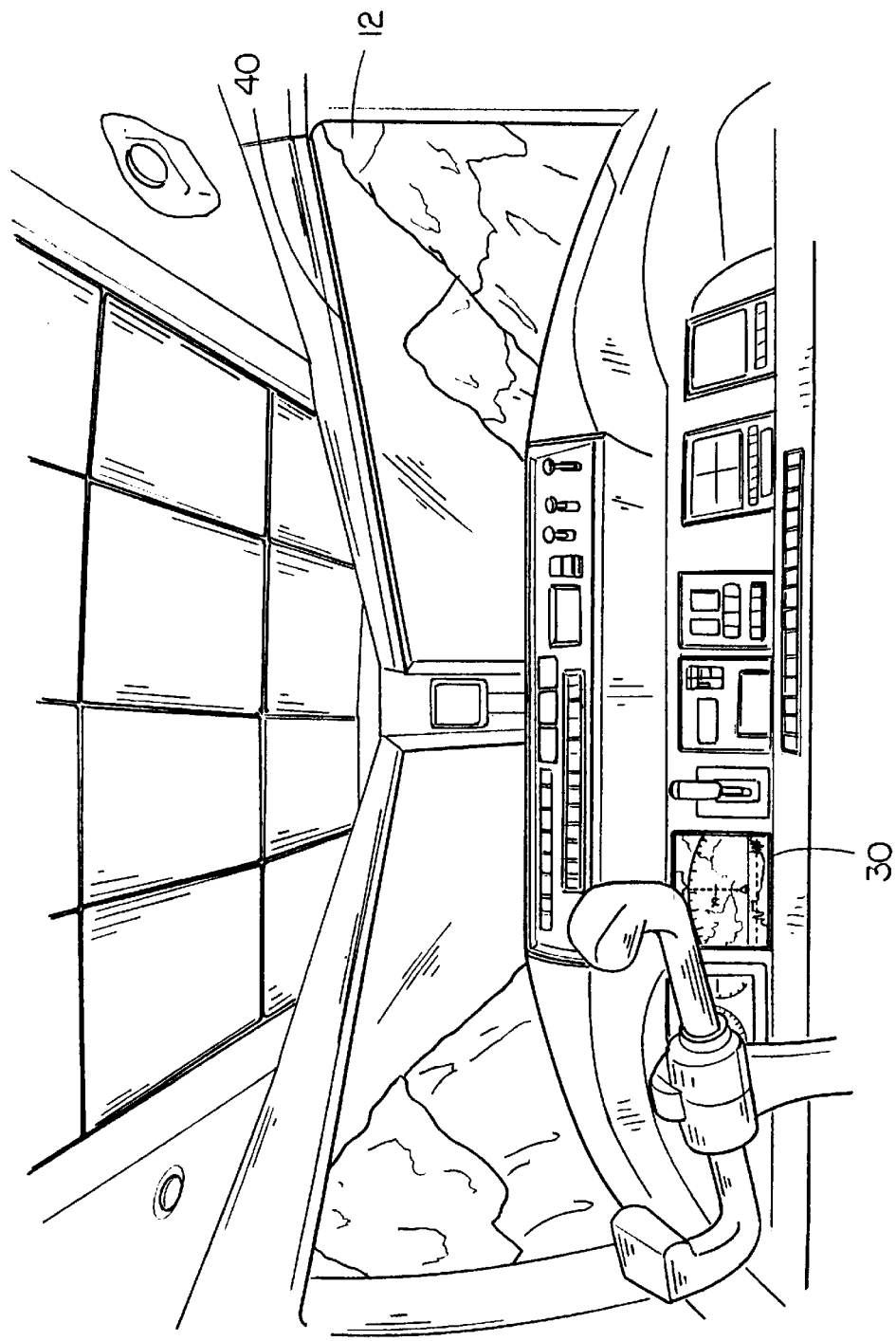
FIG. 4 shows the flightdeck of an aircraft employing the terrain situational awareness system according to the present invention.

Referring now to FIG. 4, there is shown a pictorial representation of the flightdeck of an aircraft employing the terrain situational awareness system according to the present invention. While the terrain obstacles 12 are shown to be visible through the flightdeck window 40 for illustrative purposes, the advantages of the present invention will become especially apparent when flying at night, under Instrument Flight Rules (IFR), or otherwise poor visibility conditions.

Additionally, threat determinations may be made on altitude differences or on a function including such parameters as aircraft flight path, velocity, configuration, performance capabilities, and the like.

A detailed description of the GPS may be found in *Global Positioning System Standard Positioning Service Signal Specification*, 2d Ed. (Jun. 2, 1995), herein incorporated by reference in its entirety.

The description above should not be construed as limiting the scope of the invention, but as merely providing an illustration to some of the presently preferred embodiments of this invention. In light of the above description and examples, various other modifications and variations will now become apparent to those skilled in the art without departing from the spirit and scope of the present invention as defined by the appended claims. For example, the present invention may be utilized to integrate further information so as to provide additional situational awareness information concerning other potential hazards (e.g., other aircraft, weather, and the like). Likewise, the present invention may be readily adapted and utilized in vehicles other than aircraft, for example, ground-based vehicles as well as surface or subsurface water-based vehicles. Accordingly, the scope of the invention should be determined solely by the appended claims and their legal equivalents.

What is claimed is:

1. A visual display format for a situational awareness system comprising:
    horizontal terrain elevation view wherein the horizontal terrain elevation view is a display of terrain elevation relative to a vehicle's position including vehicle's altitude; and
    a profile terrain elevation view wherein the profile terrain elevation view is a display of vertical terrain profile in a line from directly in front of the vehicle out to a selected distance.

2. The visual display format according to claim 1 wherein said position is determined using data from a satellite-based positioning system, ground-positioning system, inertial navigation system, terrain correlation system, radar correlation system altimeter system, or dead reckoning, or any combination thereof.

3. The visual display format according to claim 2 wherein said satellite-based positioning system is GNSS.

4. The visual display format according to claim 2 wherein said positioning system is determined using a position determination function.

5. The visual display format according to claim 2 wherein said satellite-based positioning system is at least one of Global Positioning System, Global Orbiting Navigation Satellite System (GLONASS), and GNSS-2, a satellite based augmentation system, and a ground based augmentation system.

6. The visual display format according to claim 2 wherein said position is determined using a LORAN radio navigation signal and an altimeter.

7. The visual display format according to claim 6 wherein said Loran radio navigation signal is a Loran C radio navigation signal.

8. The visual display format according to claim 1 further comprising an altitude display.

9. The visual display format according to claim 1 further comprising at least one of vehicle heading and selected vehicle heading.

10. The visual display format according to claim 1 comprising a first portion displaying said horizontal elevation view and a second portion displaying said profile elevation view.

11. The visual display format according to claim 1 wherein said display portrays the hazards to a vehicle based upon a calculated function including at least one of altitude separation, vehicle motion, vehicle performance envelope, environmental factors, and aircraft configuration.

12. The visual display format according to claim 1 employing a color coding scheme corresponding to elevations relative to the vehicle's altitude.

13. The visual display format according to claim 12 wherein said color coding scheme employs the color blue to represent bodies of water.

14. The visual display format according to claim 12 wherein said color coding scheme employs the color red for elevations approximately equal to the vehicle's altitude and above.

15. The visual display format according to claim 14 wherein said color coding scheme employs the color green for elevations lower than a predetermined beneath the vehicle's altitude.

16. The visual display format according to claim 15 wherein said color coding scheme employs the color yellow for elevations less than the vehicle's altitude but above the predetermined distance beneath the vehicle's altitude.

17. The visual display format according to claim 15 wherein said predetermined distance is from about 1000 feet to about 2000 feet.

18. The visual display format according to claim 17 wherein said predetermined distance is about 1500 feet.

19. The visual display format according to claim 1 wherein said horizontal and profile terrain elevation views are determined based on terrain data stored in a database.

20. The visual display format according to claim 19 wherein said terrain database includes natural terrain data.

21. The visual display format according to claim 19 wherein terrain database includes man-made objects.

22. The visual display format according to claim 19 wherein said terrain database includes boundaries and other virtual objects.

23. The visual display format according to claim 19 wherein said display displays at least one of navigational information including at least one of mission plan, airport location, docking location, and restricted space.

24. The visual display format according to claim 23 wherein said display displays at least one potential hazard to the vehicle, occupants, and cargo including at least one of the position of other vehicles, weather information, atmospheric hazards, hazardous contaminants, animals posing a threat to the vehicle, and air/water currents.

25. The visual display format according to claim 1 wherein the selected distance is selectable in specified increments.

26. The visual display format according to claim 25 wherein the specified increments are 10, 20, 40, 80, 160, 320, and 640 nautical miles.

27. The visual display format according to claim 1 wherein the selected distance is continuously selectable.

28. A terrain situational awareness system comprising a visual display format comprising:
    a horizontal elevation view wherein the horizontal terrain elevation view is a display of terrain elevation relative to a vehicle's position including vehicle's altitude; and
    a profile elevation view wherein the profile terrain elevation view is a display of vertical terrain profile in a line directly in front of the vehicle out to a selected distance.

29. The visual display format according to claim 28 wherein said position is determined using a LORAN radio navigation signal and an altimeter.

30. The visual display format according to claim 29 wherein said loran radio navigation signal is a LORAN C radio navigation signal.

31. The visual display format according to claim 28 further comprising a barometric altitude display.

32. The visual display format according to claim 28 further comprising vehicle heading and selected vehicle heading.

33. The terrain situational awareness system according to claim 28 wherein said horizon and profile terrain elevation views are calculated from terrain elevation data stored in a database.

34. The visual display format according to claim 23 employing a color coding scheme corresponding to elevations relative to an vehicle's altitude.

35. The visual display format according to claim 34 wherein said color coding scheme employs the color red for elevations above the vehicle's altitude and for elevations less than vehicle's altitude but above a predetermined distance beneath the vehicle's altitude.

36. The visual display format according to claim 35 wherein said color coding scheme employs the color green for elevations lower than a predetermined distance beneath the vehicle's altitude.

37. The visual display format according to claim 34 wherein said color coding scheme employs the color red for elevations approximately equal to the vehicle's altitude and above.

38. The visual display format according to claim 37 wherein said color coding scheme employs the color green for elevations lower than the vehicle's altitude.

39. The visual display format according to claim 37 wherein said color coding scheme employs the color yellow for elevations approximately equal to the vehicle's altitude and higher than a predetermined distance beneath the vehicle's altitude and the color green for elevations lower than a predetermined distance beneath the vehicle's altitude.

40. The visual display format according to claim 39 wherein said color coding scheme employs the color blue to represent bodies of water.

41. The visual display format according to claim 40 wherein said predetermined distance is from about 1000 feet to about 2000 feet.

42. The visual display format according to claim 41 wherein said predetermined distance is about 1500 feet.

43. The visual display format according to claim 28 wherein said position is determined using data from a satellite-based positioning system.

44. The visual display format according to claim 43 wherein said satellite-based positioning system is at least one of GPS, GLONASS, GNSS, and GNSS-2.

45. The visual display format according to claim 44 further comprising accuracy enhancing augmentations.

46. The visual display format according to claim 44 wherein said satellite-based positioning system is the GPS Navstar Global Positioning System Precise Positioning Service.

47. A ground collision avoidance system comprising a terrain situational awareness system comprising:
    a horizontal terrain elevation view wherein the horizontal terrain elevation view is a display of terrain elevation relative to a vehicle's position including vehicle's altitude; and
    a profile terrain elevation view wherein the profile terrain elevation view is a display of vertical terrain profile in a line from directly in front of the vehicle out to a selected distance.

48. The ground collision avoidance system according to claim 47 comprising a satellite positioning system receiver, a database comprising terrain elevation data, a processor for calculating position and relative terrain elevation, means for integrating horizontal and profile display data onto a single display, and a display.

49. A flight management system comprising a terrain situational awareness system comprising:
    a horizontal elevation view wherein the horizontal terrain elevation view is a display of terrain elevation relative to a vehicle's position including vehicle's altitude; and
    a profile terrain elevation view wherein the profile terrain elevation view is a display of vertical terrain profile in a line from directly in front of the vehicle out to a selected distance.

50. A method for preventing collisions with the ground for a vehicle comprising the steps of:
    providing a terrain database;
    calculating a position including of said vehicle;
    displaying the position of said vehicle and the surrounding terrain, wherein the horizontal and profile views of the surrounding terrain are displayed on a single display screen with the horizontal terrain elevation view displayed relative to the vehicle's position and the profile terrain elevation view displayed as a vertical terrain profile line from directly in front of the vehicle out to a selected distance.

51. The method of claim 50 wherein said step of calculating the position of said vehicle comprises the steps of receiving a reference signal from a satellite-based positioning system and calculating the coordinate position and altitude of the vehicle.

52. The method of claim 51 wherein said satellite-based positioning system is a GPS Navstar Global Positioning System.

53. The method of claim 52 wherein said loran radio navigation signal comprises a LORAN C signal.

54. The method of claim 50 wherein said step of calculating the position of said vehicle comprises the steps of receiving a LORAN radio navigation signal and an altimeter signal and calculating the coordinate position and altitude of the vehicle.

55. In a ground collision avoidance system, the improvement comprising an integrated display format wherein horizontal and profile terrain elevation views are combined onto a single display with the horizontal terrain elevation view displayed relative to a vehicle's position including altitude and the profile terrain elevation view displayed as a vertical terrain profile line from directly in front of the vehicle out to a selected distance.

* * * * *